United States Patent [19]
Takeuchi et al.

[11] Patent Number: 6,051,790
[45] Date of Patent: Apr. 18, 2000

[54] WIRE HARNESS-MOUNTING CONSTRUCTION

[75] Inventors: Syunsaku Takeuchi, Aichi; Hiroaki Yamada, Shizuoka, both of Japan

[73] Assignee: Yazaki Corporation, Tokyo, Japan

[21] Appl. No.: 09/090,149

[22] Filed: Jun. 4, 1998

[30] Foreign Application Priority Data

Jun. 27, 1997 [JP] Japan ................................. 9-172269

[51] Int. Cl.[7] ............................... H02G 3/00; H02G 3/24
[52] U.S. Cl. .................................. 174/72 A; 174/72 TR; 174/70 R
[58] Field of Search ........................... 174/72 A, 72 TR, 174/72 R, 70 R; 439/34; 307/10.1

[56] References Cited

U.S. PATENT DOCUMENTS

| | | | |
|---|---|---|---|
| 5,405,672 | 4/1995 | Takiguchi et al. | 428/119 |
| 5,460,530 | 10/1995 | Toba et al. | 439/34 |
| 5,556,059 | 9/1996 | Maeda et al. | 248/49 |
| 5,588,260 | 12/1996 | Suzuki et al. | 49/502 |
| 5,846,091 | 12/1998 | Nashijima et al. | 439/34 |
| 5,918,365 | 7/1999 | Uchida et al. | 29/868 |
| 5,931,682 | 8/1999 | Takiguchi et al. | 439/34 |

FOREIGN PATENT DOCUMENTS

| | | | |
|---|---|---|---|
| 0 534 659 | 3/1993 | European Pat. Off. | B60R 16/02 |
| 2-46438 | 12/1990 | Japan | B60R 16/02 |
| 5-62552 | 3/1993 | Japan | H01B 17/58 |
| 6-80329 | 11/1994 | Japan | H02G 3/28 |
| 6-80330 | 11/1994 | Japan | H02G 3/28 |
| 7-5969 | 1/1995 | Japan | B60R 16/02 |
| 8-40155 | 2/1996 | Japan | B60R 16/02 |

*Primary Examiner*—Kristine Kincaid
*Assistant Examiner*—Mark Olds
*Attorney, Agent, or Firm*—Sughrue, Mion, Zinn, Macpeak & Seas, PLLC

[57] ABSTRACT

In a wire harness-mounting construction of the present invention, a generally L-shaped recess 2, formed in a continuous manner in a door side plate portion A2 and a door inner plate portion A2 of a door frame A, includes a deep groove portion 3 having a deep central bottoms, and a shallow groove portion 4 which is formed shallow around the deep groove portion 3, and receives a grommet cover 11. Amounting member 10 of a generally L-shape, received in the recess 2, includes the grommet cover 11 having an inner member 41 of a rigid material provided therein, and a projection 14 is formed integrally on an abutment surface of the grommet cover held against the door side plate portion A2, and extends generally along a peripheral edge of a frame portion formed on the abutment surface. A Lip-like projection 18 is formed on and extends along a peripheral edge of a peripheral portion 17, and a notch groove 19, communicating with the exterior, is formed in a lowermost portion of the peripheral portion 17.

9 Claims, 9 Drawing Sheets

WIRE HARNESS-MOUNTING CONSTRUCTION

BACKGROUND OF THE INVENTION

This invention relates to a construction of mounting a wire harness for a door of an automobile or the like, and more particularly to a wire harness-mounting construction in which a bundled end portion of a wire harness to be connected to various electric parts mounted within a door frame is extended from a vehicle body, and is mounted on a door side plate through a mounting member and a grommet.

There have heretofore been proposed various constructions of mounting a wire harness for a door of an automobile or the like, in which a bundled end portion of the wire harness to be connected to various electric parts mounted within a door frame is extended from a vehicle body, and is mounted on a door side plate through a mounting member and a grommet.

Figure 1:
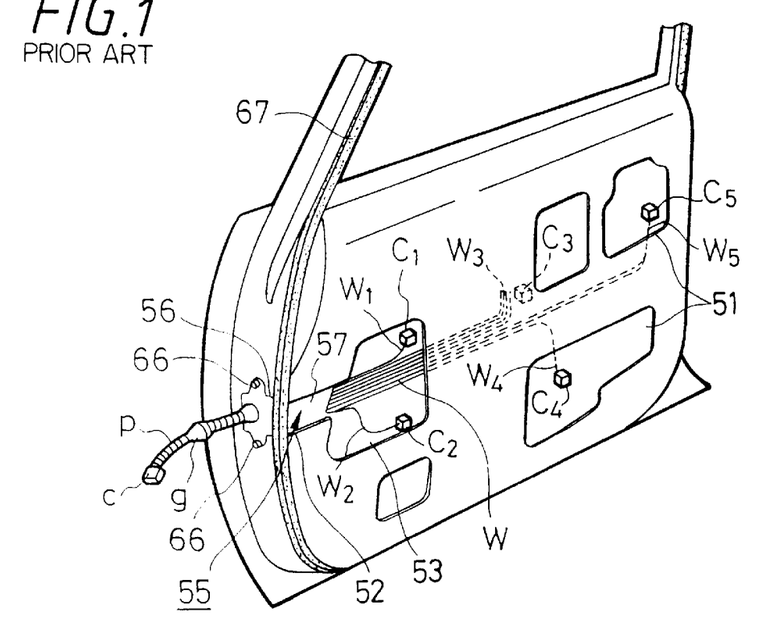
FIG. 1 is a perspective view showing a conventional wire harness-mounting construction.
Figure 2:
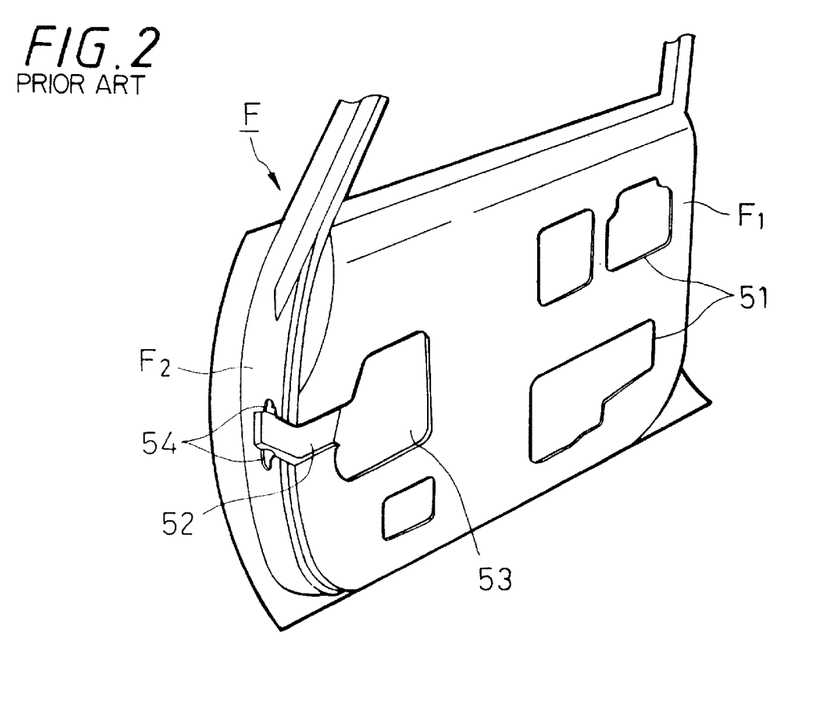
FIG. 2 is a perspective view of a door frame of FIG. 1.

FIG. 1 shows a door wire harness-mounting construction disclosed in Japanese Utility Model Examined Publication No. 2-46438, and this Figure shows a condition in which the mounting of a wire harness is completed. As shown in FIG. 2, a door frame F includes an inner plate portion F1, and a side plate portion F2, and a plurality of notches 51 for enabling necessary operations formed through the inner plate portion F1.

A generally L-shaped recess 52 is formed in a continuous manner in the side plate portion F2 (disposed at the door hinge side) and the inner plate portion F1 of the door frame F, and this recess is continuous with a notch 53 formed in the inner plate portion F1. Mounting recesses 54 are formed respectively in upper and lower edges of that-portion of the recess 52 formed in the side plate portion F2.

As shown in FIG. 1, a mounting member 55 of a generally L-shape is fixed to the mounting recesses 54, and an end portion of the door wire harness W is mounted to extend to a predetermined position through the mounting member 55. A bundle lead-out portion p is provided at that end of the door wire harness W to be connected to a cowl-side harness on a vehicle body, and a grommet g, made of a rubber material, is fitted on this bundle lead-out portion p. Namely, within the door panel, the wire harness W is divided into branch wires W1 to W5, and connectors C1 to C5 are connected respectively to ends of these branch wires, and are connected respectively to electric parts mounted on the door.

Figure 3:
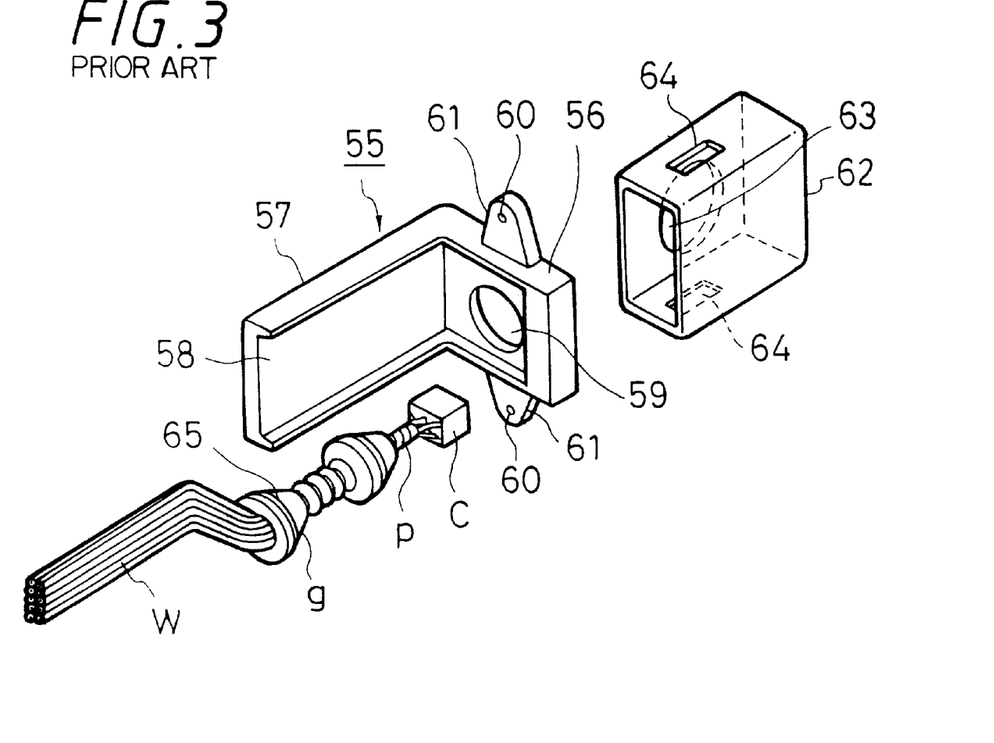
FIG. 3 is an exploded, perspective view of an important portion of FIG. 1.

As shown in FIG. 3, the L-shaped mounting member 55 includes a wire harness lead-out portion 56 for engagement with the side plate portion F2 of the door frame, and a wire harness support portion 57 for engagement with the inner plate portion F1, and a wide wire harness-receiving groove 58 is formed in inner sides of the wire harness lead-out portion 56 and wire harness support portion 57.

A through hole 59 is formed through the wire harness lead-out portion 56, and mounting flanges 61 each having a mounting hole 60 are formed respectively on upper and lower sides of the wire harness lead-out portion 56. A hollow waterproof rubber cover 62 of a rectangular parallelepiped shape is fitted on the wire harness lead-out portion 56. This waterproof cover 62 has a through hole 63 aligned with the through hole 59 in the wire harness lead-out portion 56, and also has two through holes 64 through which the mounting flanges 61 pass, respectively.

For mounting the wire harness W on the mounting member 55, a flat portion of the wire harness W is bonded by an adhesive or the like to the inner surface of that portion of the receiving groove 58 formed in the wire harness support portion 57 of the mounting member 55, and the bundle lead-out portion p is passed through the through hole 59, and then an annular groove 65, formed in the grommet g, is fitted in a peripheral edge of the through hole 59.

Figure 4:
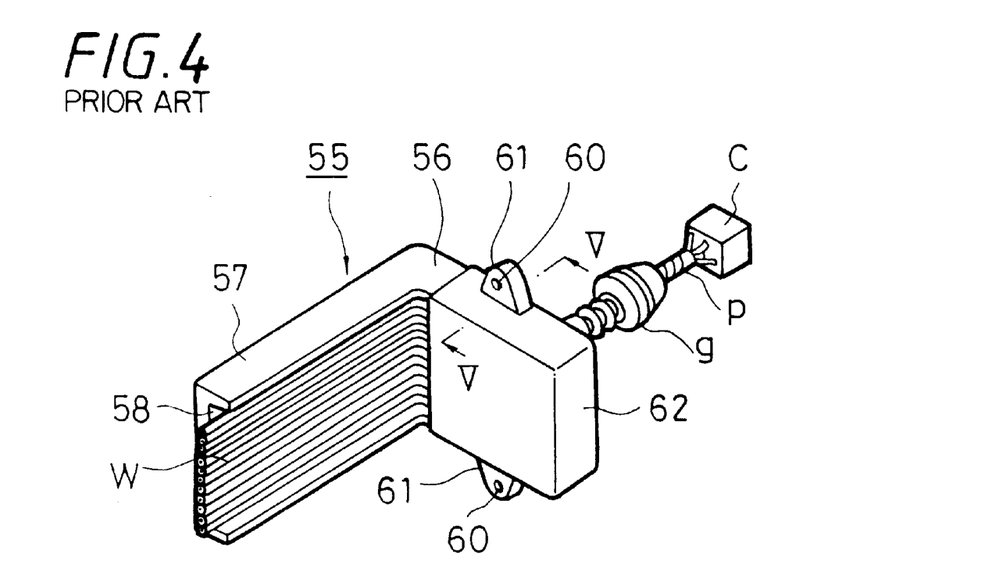
FIG. 4 is a perspective view showing an assembled condition of the parts of FIG. 3.
Figure 5:
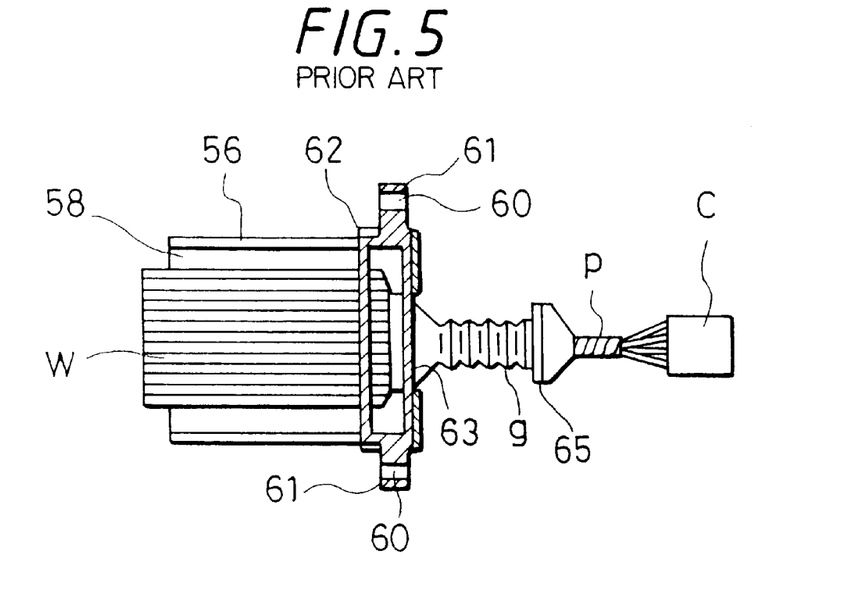
FIG. 5 is a cross-sectional view taken along the line V—V of FIG. 4.

Then, the waterproof cover 62 is fitted on the wire harness lead-out portion 56 as shown in FIGS. 4 and 5, and in this condition, the mounting member 55 is fitted in the recess 52 (see FIG. 2) in the door frame F, and is fixed by screws 66 passing respectively through the mounting holes 60 formed respectively through the mounting flanges 61. After the mounting member 55 is thus mounted on the door frame F, a waterproof rubber member 67 is mounted on an inner edge portion of the door frame F, as shown in FIG. 1.

In the above conventional door wire harness-mounting construction, the generally L-shaped recess 52 is formed in the side plate portion F2 of the door frame, and extends to the operation hole 53 in the inner plate portion F1, and the wire harness W is supported between the generally L-shaped recess 52 and the generally L-shaped mounting member 55 fitted in this L-shaped recess. The bundle lead-out portion p of the wire harness is passed through the through hole 59 in the mounting member 55, and the end portion of the wire harness W is passed through the through hole 59 in the generally L-shaped mounting member, and then the mounting member 55 is fitted in the generally L-shaped recess 52, thereby fixing the end portion of the wire harness W.

Figure 6:
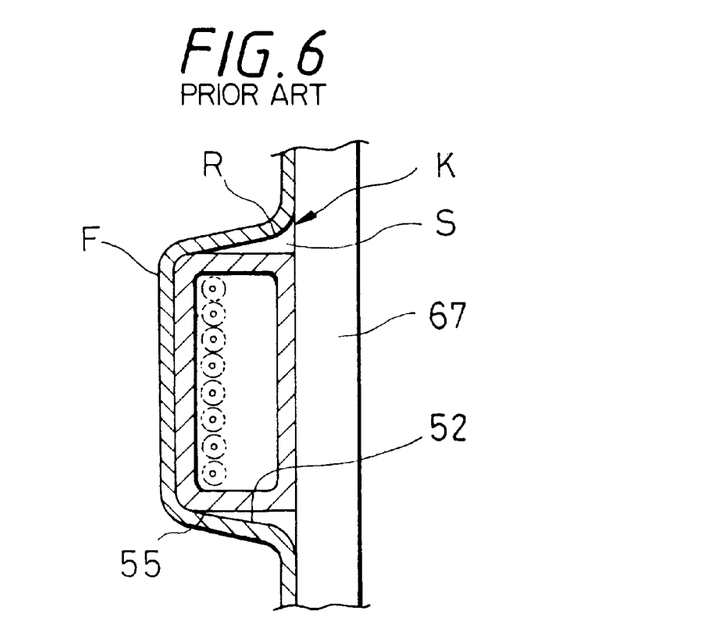
FIG. 6 is a fragmentary, cross-sectional view of an important portion of FIG. 1.

In the above conventional door wire harness-mounting construction, however, when the recess 52 is formed in the door frame F, a curved portion R is formed at a corner portion K of this recess, so that a gap S is formed between the waterproof rubber member 67 and the mounting member 55, as can be seen from FIG. 6 which is a cross-sectional view showing the mounted condition. There has been encountered a problem that rain water or the like intrudes into this gap S.

SUMMARY OF THE INVENTION

It is an object of this invention to provide a wire harness-mounting construction in which a wire harness can be easily mounted within a door frame, and the intrusion of water into a recess in the door frame can be positively prevented.

The above object can be achieved by a wire harness-mounting construction, according to the present invention, comprising:

a generally L-shaped recess continuously formed in a door side plate portion and a door inner plate portion of a door frame which is openable from a vehicle body in a hinged manner, the L-shaped recess being communicated with an opening formed on the door inner plate portion, in which the L-shaped recess includes a deep groove portion and a shallow groove portion which is formed shallow around the deep groove portion;

a mounting member fittable in the L-shaped recess, the mounting member including a protector received in the deep groove portion and a grommet cover coupled with the protector, in which the grommet cover has an abutment surface brought in surface-contact with the shallow groove portion and a frame portion formed on the abutment surface for receiving the protector therein, and a first projection extending generally along a peripheral edge of the frame portion is formed on the abutment surface; and a wire harness connectable to electric parts mounted within the door frame at one end thereof and pulled out from the inside of the door frame through the opening, the wire harness including a bundled end portion which is disposed at the other end thereof and outwardly projected from the door frame through a grommet of the grommet cover, wherein when the grommet cover is mounted in the L-shaped recess, the frame portion contacts with the shallow groove portion and an inner seal portion for sealing the wire harness is formed by bring the first projection in pressure contact with the shallow groove portion.

In the above wire harness-mounting construction, the recess is formed by the two portions, that is, the deep groove portion, receiving the protector, and the shallow groove portion which is formed shallow around the deep groove portion, and contacts the abutment surface of the grommet cover. The projection is formed integrally on the abutment surface, and extends generally along the peripheral edge of the frame portion, and when the grommet cover is fitted in the recess, the projection is held against the shallow groove portion, thereby forming the inner seal portion. Therefore, the intrusion of water or the like to the wire harness, received in the recess, is positively prevented.

In addition, in the above-mentioned wire harness-mounting construction according to the present invention, advantageously, a slanting surface is formed at a peripheral portion of the shallow groove portion, and a projection is formed integrally at a peripheral portion of the grommet cover which is abutted against the slanting surface, and when the grommet cover is fitted in the recess, the projection is held against the slanting surface, thereby forming an outer seal portion.

In the above wire harness-mounting construction, the projection at the peripheral portion of the grommet cover is abutted against the slanting surface formed at the peripheral portion of the shallow groove portion, thereby forming the outer seal portion, and therefore the outer seal portion, together with the above inner seal portion, more positively prevents water or the like from intruding to the wire harness.

Further, in the above-mentioned wire harness-mounting construction according to the present invention, advantageously, the grommet cover is made of an elastic material, and an inner member, made of a rigid material, is integrally formed in the grommet cover.

In the above wire harness-mounting construction, the rigid inner member is integrally formed in the grommet cover, and therefore the grommet cover has a sufficient strength to withstand a fastening force applied when mounting the grommet cover, and the peripheral portion and abutment surface of the grommet cover are firmly abutted against the door side plate portion of the door frame, so that the intrusion of water or the like from the exterior is more positively prevented.

Furthermore, in the above-mentioned wire harness-mounting construction according to the present invention, a drain notch groove, communicating with the exterior, is formed in a lower portion of one of the peripheral portion of the grommet cover and a peripheral portion of the recess.

In the above wire harness-mounting construction, the drain notch groove is formed in the lower portion of one of the peripheral portion of the grommet cover and the peripheral portion of the recess, and therefore, even if water or the like intrudes from the outer peripheral portion of the grommet cover for some reason, this water is positively drained by the notch groove communicating with the exterior. Therefore, the intrusion of the water into the protector, receiving the wire harness, is positively prevented.

Moreover, in the above-mentioned wire harness-mounting construction according to the present invention, the projection, formed at the peripheral portion of the grommet cover, and the projection, formed on the abutment surface, are inclined downwardly toward the outer side of the door frame when the grommet cover is attached to the door frame.

In the above wire harness-mounting construction, the projection, formed at the peripheral portion of the grommet cover, and the projection, formed on the abutment surface, are inclined downwardly toward the outer side of the door frame when the grommet cover is attached to the door frame, and therefore, the outer seal portion and the inner seal portion, formed when the grommet cover is attached to the door frame, are slanting downwardly toward the outer side-of the door frame. Therefore, rain water, which has intruded to the peripheral portion of the grommet cover and into the grommet cover, is positively caused to flow along the two projections toward the outer side of the door frame without residing in the grommet cover.

Still moreover, in the above-mentioned wire harness-mounting construction according to the present invention, advantageously, that portion of the recess, formed in the door side plate portion, is slanting downwardly toward the outer side of the door frame.

In the above wire harness-mounting construction, the recess is thus slanting downwardly toward the outer side of the door frame, and therefore by attaching the grommet cover to the door frame, the outer seal portion and the inner seal portion are positively and easily slanted downwardly toward the outer side of the door frame. Therefore, rain water, which has intruded to the peripheral portion of the grommet cover and into the grommet cover, is positively caused to flow toward the outer side of the door frame.

In addition, in the above-mentioned wire harness-mounting construction according to the present invention, preferably, an engagement portion for engagement with the protector is formed at an appropriate portion of the inner member provided in the grommet cover, and also a retaining portion for being retained by the engagement portion is formed at the end of the protector.

In the above wire harness-mounting construction, the engagement portion is provided at the inner member, and the retaining portion for engagement with the engagement portion is provided at the end of the protector, and therefore, the wire harness, connected to the electric parts mounted within the door frame, can be positively received in the mounting member constituted by the grommet cover and the protector. Therefore, the mounting member is fitted in the recess in the door frame, and the wire harness can be easily installed to be connected to the electric parts within the door frame, and the efficiency of the assembling operation is enhanced.

Further, in the above-mentioned wire harness-mounting construction according to the present invention, preferably, the retaining portion of the protector is engaged with the engagement portion of the inner member after the wire harness is received in the protector, and a winding portion, provided at the other end of the protector, and a winding member-winding portion, provided at the other end of the inner member, are tied together by a winding member wound on the winding portions.

In the above wire harness-mounting construction, after the wire harness to be connected to the electric parts, mounted within the door frame, is received in the mounting member constituted by the grommet cover and the protector, the winding portions, provided respectively at the other ends of the protector and the inner member, are tied together at a time by the winding member wound on these winding portions. Therefore, the mounting member is fitted in the recess in the door frame, and the wire harness can be more easily installed to be connected to the electric parts within the door frame, and the efficiency of the assembling operation is further enhanced.

DETAINED DESCRIPTION OF THE PREFERRED EMBODIMENTS

Figure 7:
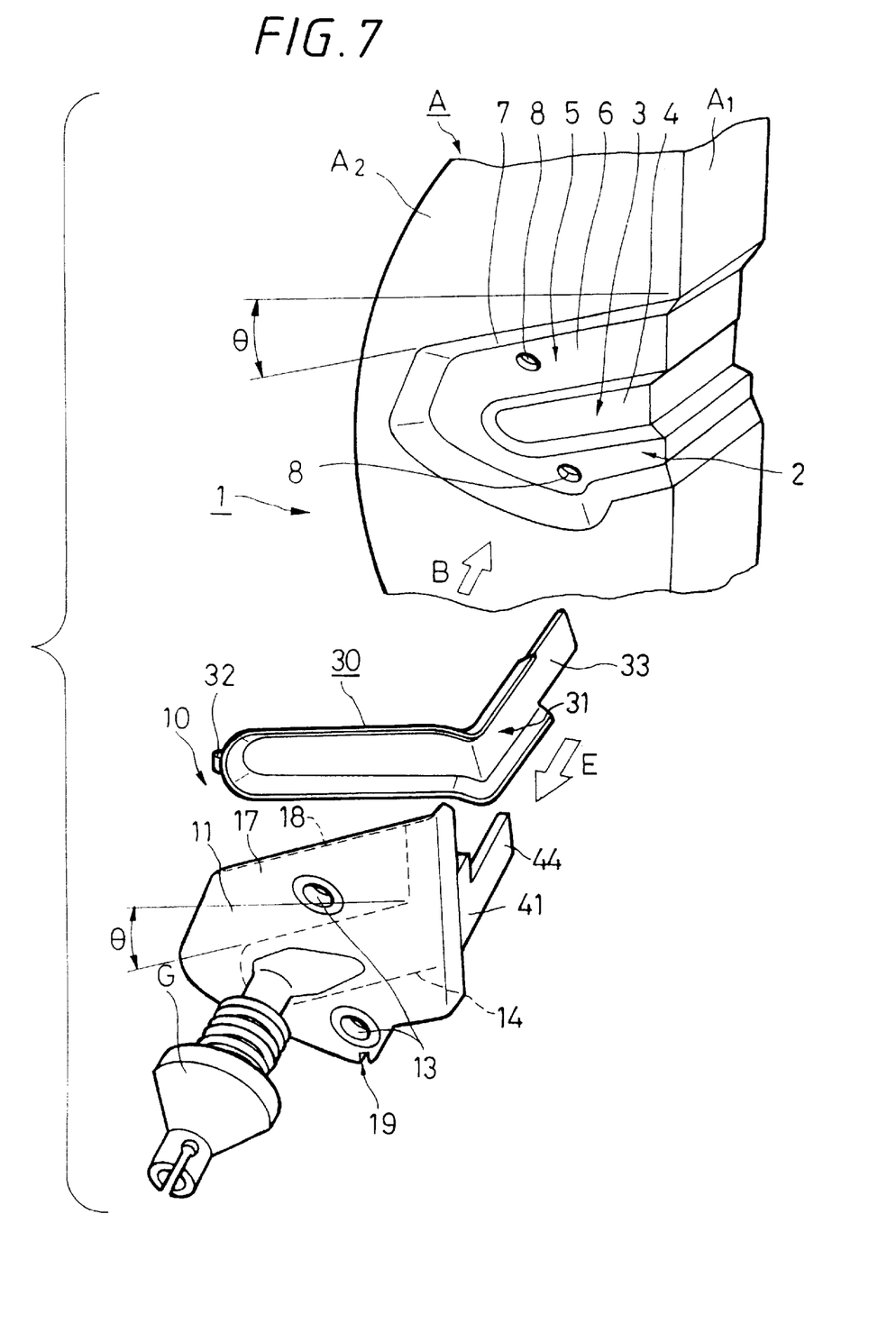
FIG. 7 is an exploded, perspective view of a wire harness-mounting construction of the present invention.
Figure 8:
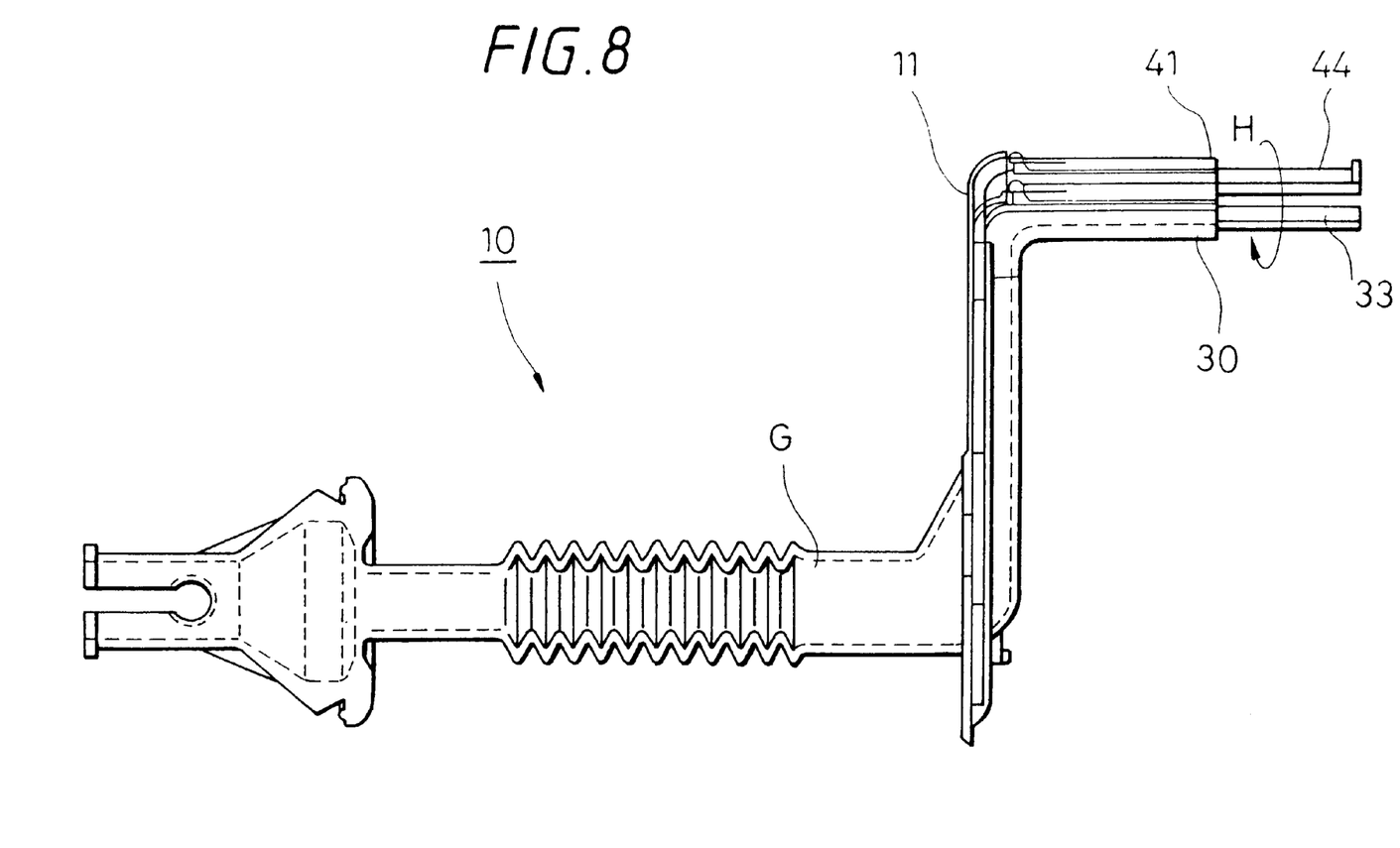
FIG. 8 is a plan view showing an assembled condition of a mounting member of FIG. 7.
Figure 9:
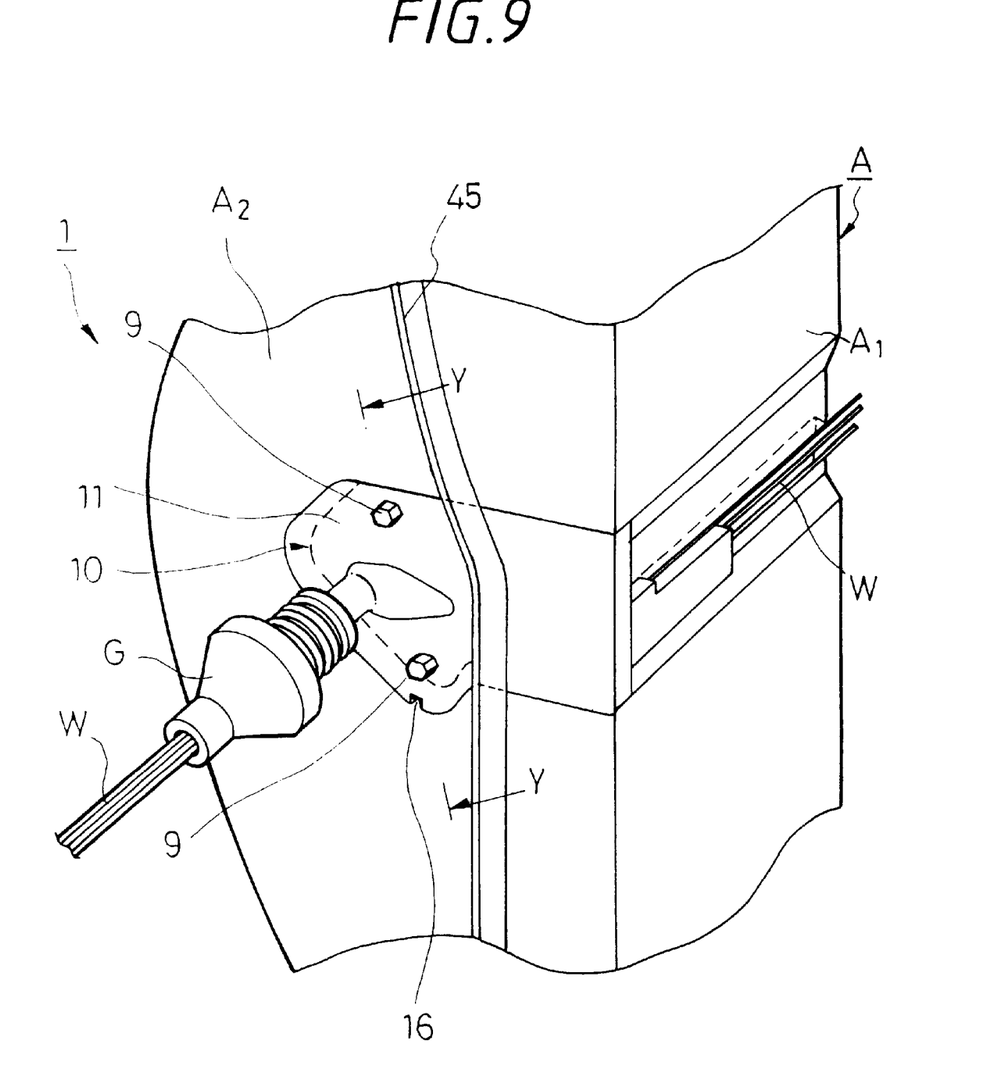
FIG. 9 is a perspective view showing the mounting member of FIG. 8 mounted on a door panel.
Figure 10:
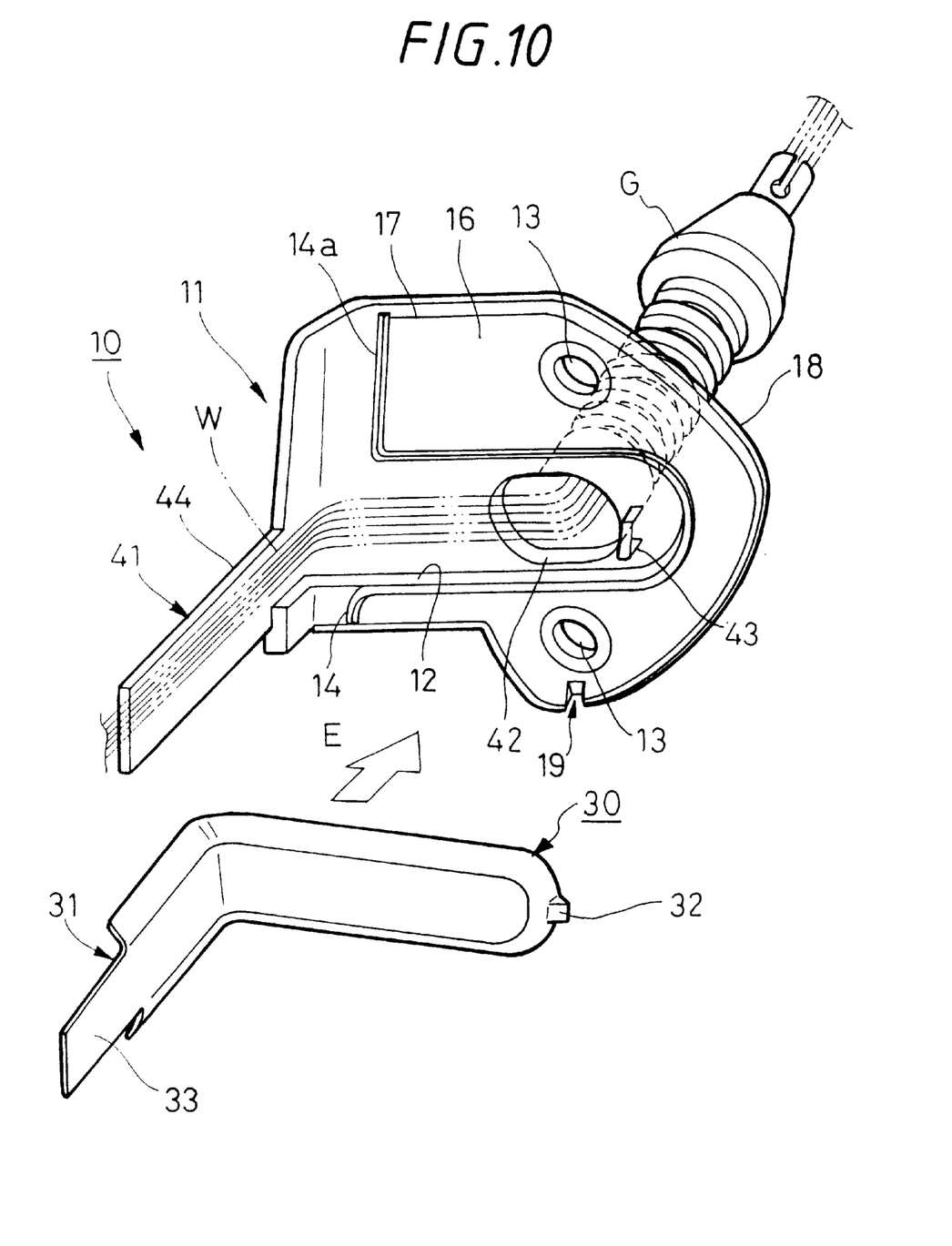
FIG. 10 is an exploded, perspective view of the mounting member of FIG. 7 as seen from another angle.
Figure 11:
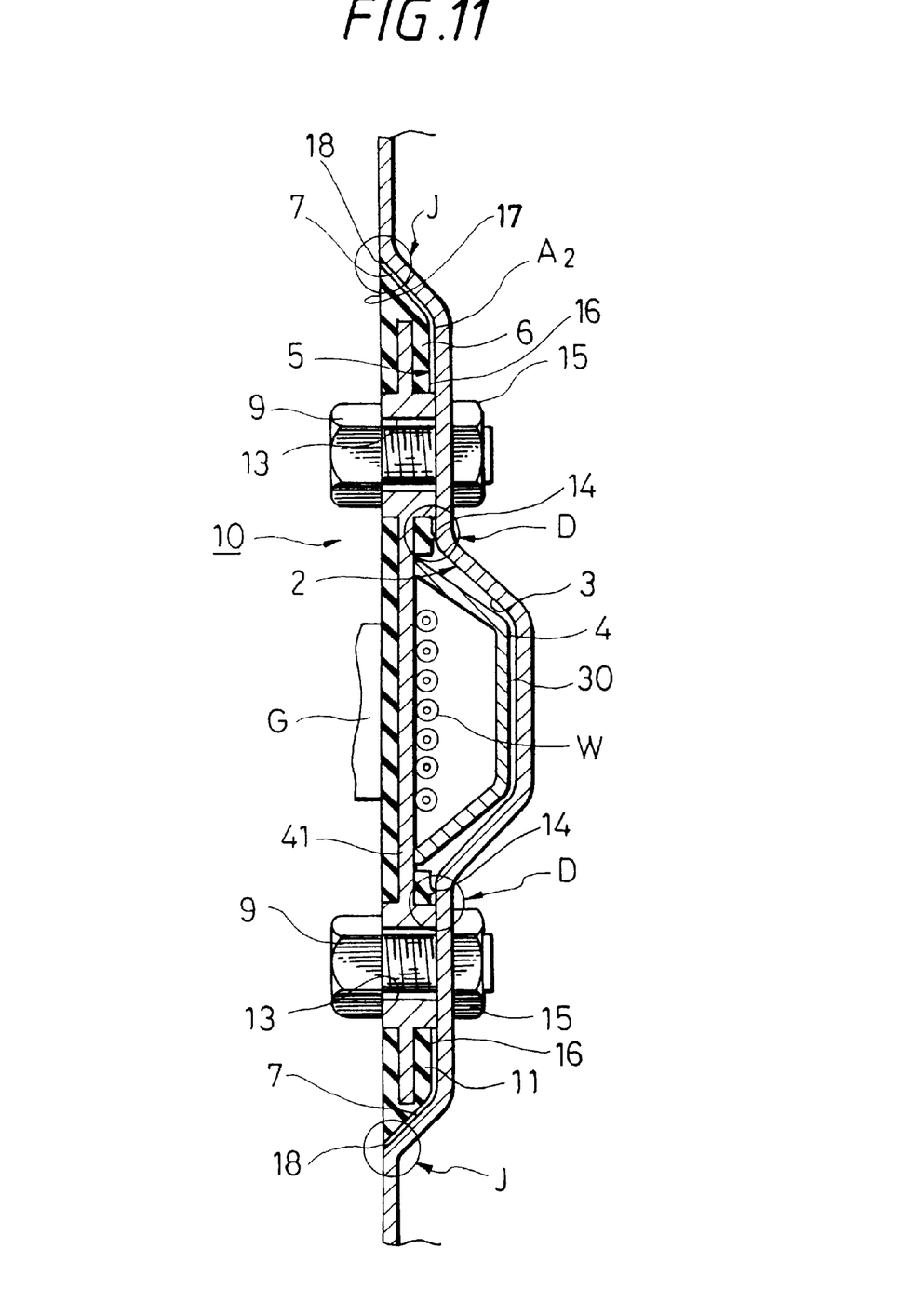
FIG. 11 is a cross-sectional view taken along the line Y—Y of FIG. 9.

One preferred embodiment of a wire harness-mounting construction of the present invention will now be described in detail with reference to FIGS. 7 to 12. FIG. 7 is an exploded, perspective view of the wire harness-mounting construction of the invention, FIG. 8 is a plan view showing an assembled condition of a mounting member of FIG. 7, FIG. 9 is a perspective view showing the mounting member of FIG. 8 mounted on a door panel, FIG. 10 is an exploded, perspective view of the mounting member of FIG. 7 as seen from another angle, FIG. 11 is a cross-sectional view taken along the line Y—Y of FIG. 9, and FIG. 12 is an enlarged view of an important portion of FIG. 11.

As shown in FIG. 7, the wire harness-mounting construction 1 of this embodiment is constituted by a generally L-shaped recess 2 formed in a continuous manner in a door inner plate portion A1 and a door side plate portion A2 of a door frame A, and the mounting member 10 fitted in this recess. As shown in FIG. 1, the mounting member 10 comprises a protector 30 for receiving a wire harness W therein, and a grommet cover 11 which covers the protector 30 to protect the wire harness W, and connects the door frame to a vehicle body.

The door frame A shown in FIG. 7 includes the door inner plate portion A1, and the door side plate portion A2 disposed at a door hinge side, and the generally L-shaped recess 2 is formed in a continuous manner in the door side plate portion A2 and the door inner plate portion A1. A deep groove portion 3 whose bottom 4 is the deepest portion of the deep grove portion is formed in a central portion of the bottom of the recess 2, and a shallow groove portion 5, having a shallow bottom 6, is formed around the deep groove portion 3, and a slanting surface 7 is formed at a peripheral portion of the shallow groove portion 5. A pair of through holes 8 and 8 for respectively passing fixing bolts therethrough are formed in the shallow bottom portion 5.

The recess 2 is inclined downwardly toward the outer side of the door frame A at an angle of θ with respect to the door side plate portion A2 so that the grommet cover 11 can be attached thereto in an outwardly-inclined manner.

As shown in FIG. 10, the grommet cover 11 is made of an elastic material such as rubber, and an inner member 41 in the form of a metal plate or a synthetic resin plate is insert molded in this elastic material. The grommet cover 11 has a generally L-shape generally identical to the shape of the shallow groove portion 5 of the generally L-shaped recess 2 formed in the door frame A. The grommet cover 11 has such a thickness that when it is fitted in the recess 2, the surface of the grommet cover 11 lies flush with the surface of the door frame A. Through holes 13 (which are to be aligned respectively with the through holes 8 in the door frame A) for respectively passing the fixing bolts 9 therethrough are formed through the grommet cover 11, and a drain notch groove 19, communicating with the exterior, is formed in that portion of a peripheral portion 17 which is disposed at a lowermost position when the grommet cover 11 is fitted in the recess 2.

Figure 12A:
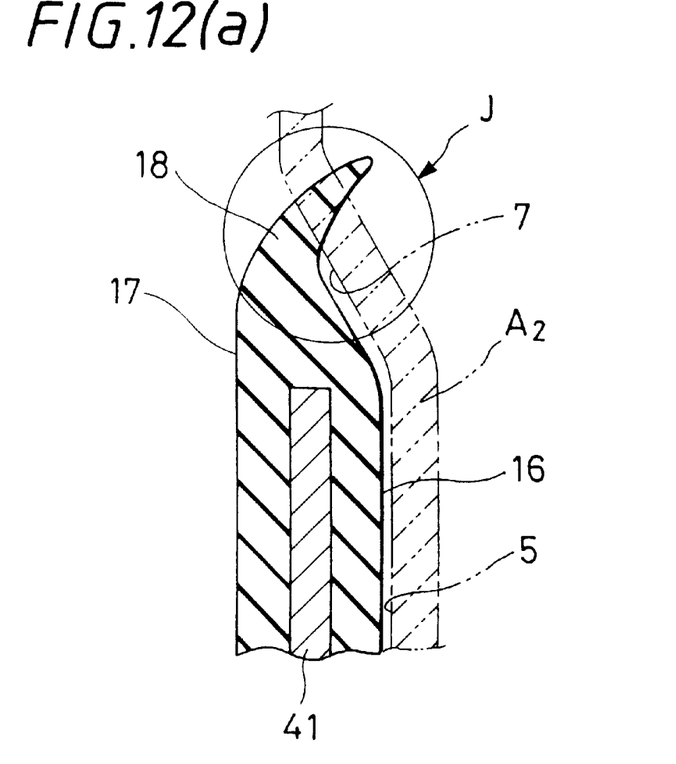
FIGS. 12(a) and 12(b) are enlarged views of important portions of FIG. 11, FIG. 12(a) showing an outer seal portion, and FIG. 12(b) showing an inner seal portion.
Figure 12B:
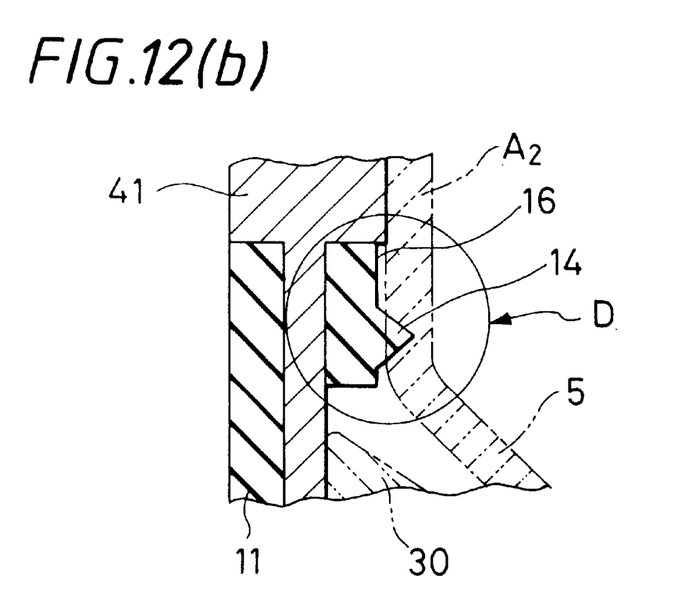

A lip-like projection 18 (see FIG. 12(a)) is formed integrally on an outer peripheral edge of the peripheral portion 17 of the grommet cover 11 which is to be abutted against the slanting surface 7 formed at the peripheral portion of the shallow groove portion 5. Therefore, when the grommet cover 11 is fitted in the recess 2, the projection 18 is held against the slanting surface 7, thereby forming an outer seal portion (first seal portion) J (see FIG. 11). At this time, the projection 18 is slanting downwardly toward the outer side of the door frame A since the recess 2 is slanting downwardly toward the outer side of the door frame A. Therefore, when the grommet cover 11 is fitted in the recess 2, the outer seal portion J is slanting downwardly toward the outer side of the door frame A, and water or the like is positively caused to flow along the projection 18 toward the outer side of the door frame A.

A frame portion 12, having a bottom defined by the inner member 41, is formed at the inner side of the grommet cover 11, that is, at an abutment surface 16 for contact with the shallow groove portion 5. The wire harness W is arranged in the frame portion 12, and the protector 30 is attached to this frame portion 12. A projection 14 (see FIG. 12(b)) is formed integrally on the abutment surface 16, and extends along an peripheral edge of the frame portion 12, and projects toward the shallow groove portion 5.

The projection 14 extends from one end of the frame portion 12 to the vicinity of the other end thereof along the peripheral edge of the frame portion 12, and the projection 14 is bent generally perpendicularly at the vicinity of the other end of the frame portion 12, and extends to the vicinity of the upper end of the abutment surface 16. Namely, the projection 14 is formed on the abutment surface 16 for contact with the door side plate portion A2, and is provided inwardly of a weather strip 45 (see FIG. 9), and the perpendicularly-bent projection portion 14a prevents high-pressure water or rain water (forced by air pressure or the like), passing through the outer seal portion J against the inclination, from intruding toward the inner side portion of the door side plate portion A2.

Therefore, when the grommet cover 11 is fitted in the recess 2, the projection 14 is held against the shallow groove portion 5, thereby forming an inner seal portion (second seal portion) D (see FIG. 11). At this time, the projection 14 is slanting downwardly toward the outer side of the door frame A since the recess 2 is slanting downwardly toward the outer side of the door frame A. Therefore, when the grommet cover 11 is fitted in the recess 2, the inner seal portion D is slanting downwardly toward the outer side of the door frame A, and water, which has intruded into the grommet cover 11, is positively caused to flow toward the outer side of the door frame A along the projection 14.

For draining water or the like toward the outer side of the door frame A, it is only necessary that the projection 14 and the projection 18 (which constitute the inner seal portion D and the outer seal portion J, respectively) be slanting downwardly toward the outer side of the door frame A, and the same effect can be obtained by an arrangement in which the recess 2 is not slanted, and the two projections 14 and 18, formed on the grommet cover 11, are slanting downwardly toward the outer side of the door frame A (see FIG. 7).

An insertion hole 42 of an oval shape, communicating with a grommet G, is formed through the inner member 41 at the frame portion 12 formed on the inner side of the grommet cover 11, and an engagement portion 43, which engages a retaining portion 32 of the protector 30 when the protector 30 is attached, is formed on that portion of the inner member 41 disposed adjacent to the insertion hole 42. The inner member 41 is bent substantially perpendicularly so as to correspond in shape to the door frame A, thereby forming a tape winding portion 44 on which a tape is to be wound.

The protector 30 is formed into a shape substantially identical to the shape of the inner member 41 exposed at the frame portion 12 formed on the inner side of the grommet cover 11. Namely, the protector 30 is bent into a generally L-shape as a whole, and a groove-like receiving portion 31 for receiving the wire harness W is formed in the protector 30 over the entire length thereof. An outer edge of one end of the protector 30 is formed into an arcuate shape, and the retaining portion 32 to be retained by the engagement portion 43 of the inner member 41 is formed on this arcuate end. A winding portion 33, on which the tape is to be wound, is formed at the other end of the projector 30.

The grommet G is formed on and extends from the outer side of the grommet cover 11, and this grommet G connects the wire harness W, received in the mounting member 10, to the vehicle body, and protects the wire harness W.

In the wire harness-mounting construction 1 of the above construction, when a bundled end portion of the wire harness W (which is to be connected to various electric parts mounted within the door frame) is to be extended from the vehicle body, and is to be mounted within the door frame A, the wire harness W is first received in the groove-like receiving portion 31 in the projector 30 as shown in FIG. 10.

Then, the protector 30, receiving the wire harness W, is fitted into the frame portion 12 on the inner side of the grommet cover 11 in a direction of arrow E, and the retaining portion 32, formed at the one end of the protector 30, is engaged with the engagement portion 43 of the inner member 41, and the tape is wound (in a direction of arrow H in FIG. 8) on the winding portion 33 of the protector 30 and the winding portion 44 of the inner member 41 of the grommet cover 11 to thereby tie the two winding portions together. Thus, the mounting member 10 of a generally L-shape, constituted by the grommet cover 11 and the protector 30, is assembled.

Then, the mounting member 10 is fitted into the generally L-shaped recess 2, formed in the door inner plate portion A1 and the door side plate portion A2 of the door frame A, in a direction of arrow B (FIG. 7), and is fixedly secured to the door frame A by the fixing bolts 9, passing through the respective through holes 13 in the grommet cover 11 and the respective through holes 8 in the recessed portion 2, and nuts 15 (see FIGS. 7 and 11). At this time, the grommet cover 11 is fitted in the recess 2 in inclined relation to the door frame A since the recess 2 is slanting downwardly toward the outer side of the door frame A.

Therefore, the projection 14 and the lip-like projection 18, which constitute the inner seal portion D and the outer seal portion J, respectively, are slanting downwardly toward the outer side of the door frame A. Therefore, when the grommet cover 11 is attached to the door frame A, the inner seal portion D and the outer seal portion J are slanting downwardly toward the outer side of the door frame A, and water or the like, which has intruded to the peripheral portion of the grommet cover 11 and into the interior of the grommet cover 11, is positively caused to flow toward the outer side of the door frame A along the projections 14 and 18.

After the mounting member 10 is fixedly secured to the door frame A, the weather strip 45 for preventing the intrusion of rain water or the like is attached to the door side plate portion A2 of the door frame A in overlapping relation to the mounting member 10 (see FIG. 9).

Before the above process is effected, the bundled end portion of the wire harness W, which is to be extended outwardly from the mounting member 10 toward the vehicle body, is passed through the insertion hole 42 in the inner member 41, and is further passed through the grommet G, formed on the outer side of the grommet cover 11, and is connected to the vehicle body. The wire harness W, which is to be extended toward the door frame A, is passed between the protector 30 and the inner member 41 on which the tape is to be wound, and is connected to the electric parts within the door frame A through connectors.

As described above, in the wire harness-mounting construction of this embodiment, the recess 2 includes the deep groove portion 3 receiving the protector 30, and the shallow groove portion 5 contacting the abutment surface 16 of the grommet cover 11, and the frame portion 12, which receives the wire harness W, and has the protector 30 attached thereto, is formed on the abutment surface 16 of the grommet cover 11. As shown in FIGS. 11 and 12, the projection 18 is formed integrally on the outer peripheral edge of the peripheral portion 17 of the grommet cover 11 which is abutted against the slanting surface 7 formed at the peripheral portion of the shallow groove portion 5, and therefore when the grommet cover 11 is fitted in the recess 2, the projection 18 is held against the slanting surface 7, thereby forming the outer seal portion (first seal portion) J.

The projection 14 is formed integrally on the abutment surface 16, and extends along the peripheral edge of the frame portion 12, and therefore, when the grommet cover 11 is fitted in the recess 2, the projection 14 is held against the shallow groove portion 5, thereby forming the inner seal portion (second seal portion) D.

Therefore, the inner seal portion D and the outer seal portion J positively prevent rain water or the like, falling on the door frame A, from intruding into the gap between the recessed portion 2 of the door frame A and the mounting member 10 (constituted by the grommet cover 11 and the protector 30), and particularly into the protector 30.

The grommet cover 11 is made of an elastic material, and the inner member 41, made of a rigid material, is integrally formed in the grommet cover 11, and therefore the grommet cover 11 has a sufficient strength to withstand a fastening force applied when mounting the grommet cover 11. Therefore, the grommet cover 11 can be firmly fastened to the door frame A, and the sealing effect, achieved by the outer seal portion J and the inner seal portion D, is enhanced, and the intrusion of water or the like from the exterior is positively prevented.

The drain notch groove 19, communicating with the exterior, is formed in the lower portion of the peripheral portion 17 of the grommet cover 11, and therefore even if water or the like intrudes through the outer seal portion (first seal portion) J for some reason, the intrusion of this water into the protector, receiving the wire harness, is positively prevented by the inner seal portion (second seal portion) D, and also the water is positively drained to the exterior by the drain notch groove 19.

Incidentally, a similar effect can be obtained by providing a notch groove which is formed in a lowermost portion of the recessed portion 2 in the door frame A, and communicates the door side plate portion A2 and the shallow groove portion 5 with each other.

The projection 18, formed on the peripheral edge of the peripheral portion 17 of the grommet cover 11, and the projection 14, formed on the abutment surface 16, are inclined at an angle θ downwardly toward the outer side of the door frame A when the grommet cover 11 is fitted in the door frame A. The reason for this is that portion of the recess 2, formed in the door side plate portion A2, is inclined at an angle θ downwardly toward the outer side of the door frame A.

Therefore, when the grommet cover 11 is attached to the door frame, the two projections 14 and 18 are slanting downwardly toward the outer side of the door frame A, so that the inner seal portion D and the outer seal portion J are slanting downwardly toward the outer side of the door frame A, and therefore rain after, which has intruded to the peripheral portion of the grommet cover 11 and into the grommet cover 11, is positively caused to flow along the two projections 14 and 18 toward the outer side of the door frame A without residing in the grommet cover.

The engagement portion 43 for engagement with the protector 30 is formed on the inner surface of the inner member 41, provided in the grommet cover 11, in adjacent relation to the insertion hole 42, and also the retaining portion 32 for being retained by the engagement portion 43 is formed at that end of the protector 30 corresponding to the engagement portion 43. Therefore, the wire harness W, connected to the electric parts mounted within the door frame A, can be positively received in the mounting member 10 constituted by the grommet cover 11 and the protector 30. Therefore, the mounting member 10 is fitted in the recess 2 in the door frame A, and the wire harness W can be easily installed to be connected to the electric parts within the door frame A, and the efficiency of the assembling operation is enhanced.

The retaining portion 32 of the protector 30 is engaged with the engagement portion 43 of the inner member 41 after the wire harness W is received in the protector, and the winding portions 33 and 44, provided respectively at the other ends of the protector 30 and the inner member 41, are tied together by the tape wound on these winding portions. Therefore, the wire harness W to be connected to the electric parts, mounted within the door frame A, can be more positively received in the mounting member 10 constituted by the grommet cover 11 and the protector 30, and the wire harness W and the mounting member 10 can be firmly combined together. Therefore, the mounting member 10 is fitted in the recess 2 in the door frame A, and the wire harness W can be more easily installed to be connected to the electric parts within the door frame A, and the efficiency of the assembling operation is further enhanced.

As described above, in the wire harness-mounting construction of the present invention, the recess includes the deep groove portion receiving the protector, and the shallow groove portion which is formed shallow around the deep groove portion, and contacts the abutment surface of the grommet cover, and the frame portion, which receives the wire harness, and has the protector attached thereto, is formed on the abutment surface of the grommet cover which contacts the shallow groove portion. The projection is formed integrally on the abutment surface, and extends generally along the peripheral edge of the frame portion, and when the grommet cover is fitted in the recess, the projection is held against the shallow groove portion, thereby forming the inner seal portion.

Thus, the recess is formed by the two portions, that is, the deep groove portion, receiving the protector, and the shallow groove portion which is formed shallow around the deep groove portion, and contacts the abutment surface of the grommet cover. The projection is formed integrally on the abutment surface, and extends generally along the peripheral edge of the frame portion, and when the grommet cover is fitted in the recess, the projection is held against the shallow groove portion, thereby forming the inner seal portion. Therefore, the intrusion of water or the like to the wire harness, received in the recess, is positively prevented, and there can be provided the wire harness-mounting construction having the high reliability.

The slanting surface is formed at the peripheral portion of the shallow groove portion, and the projection is formed integrally at the peripheral portion of the grommet cover which is abutted against the slanting surface, and when the grommet cover is fitted in the recess, the projection is held against the slanting surface, thereby forming the outer seal portion.

Thus, the projection at the peripheral portion of the grommet cover is abutted against the slanting surface formed at the peripheral portion of the shallow groove portion, thereby forming the outer seal portion, and therefore the outer seal portion, together with the above inner seal portion, more positively prevents water or the like from intruding to the wire harness, and there can be obtained the wire harness-mounting construction having the higher reliability.

The grommet cover is made of an elastic material, and the inner member, made of a rigid material, is integrally formed in the grommet cover.

Thus, the rigid inner member is integrally formed in the grommet cover, and therefore the grommet cover has a sufficient strength to withstand a fastening force applied when mounting the grommet cover, and the peripheral portion and abutment surface of the grommet cover are firmly abutted against the door side plate portion of the door frame, so that the intrusion of water or the like from the exterior is more positively prevented, and there can be obtained the wire harness-mounting construction having the higher reliability.

The drain notch groove, communicating with the exterior, is formed in the lower portion of one of the peripheral portion of the grommet cover and the peripheral portion of the recess.

Thus, the drain notch groove is formed in the lower portion of one of the peripheral portion of the grommet cover and the peripheral portion of the recess, and therefore, even if water or the like intrudes from the outer peripheral portion of the grommet cover for some reason, this water is positively drained by the notch groove communicating with the exterior. Therefore, the intrusion of the water into the protector, receiving the wire harness, is positively prevented, and the intruded water will not reside, and therefore there can be obtained the wire harness-mounting construction having the higher reliability.

The lip-like peripheral projection, formed at the peripheral portion of the grommet cover, and the projection, formed on the abutment surface, are inclined downwardly toward the outer side of the door frame when the grommet cover is attached to the door frame.

Therefore, the outer seal portion and the inner seal portion, formed when the grommet cover is attached to the door frame, are slanting downwardly toward the outer side of the door frame, and therefore rain water, which has intruded to the peripheral portion of the grommet cover and into the grommet cover, is positively caused to flow along the two projections toward the outer side of the door frame without residing in the grommet cover. Therefore, there can be obtained the wire harness-mounting construction having the higher reliability.

That portion of the recess, formed in the door side plate portion, is slanting downwardly toward the outer side of the door frame.

The recess is thus slanting downwardly toward the outer side of the door frame, and therefore when the grommet cover is attached to the door frame, the outer seal portion and the inner seal portion are positively slanting downwardly toward the outer side of the door frame. Therefore, rain water, which has intruded to the peripheral portion of the grommet cover and into the grommet cover, is positively caused to flow toward the outer side of the door frame, and there can be obtained the wire harness-mounting construction having the higher reliability.

The engagement portion for engagement with the protector is formed at the appropriate portion of the inner member provided in the grommet cover, and also the retaining portion for being retained by the engagement portion is formed at the end of the protector.

Thus, the engagement portion is provided at the inner member, and the retaining portion for engagement with the engagement portion is provided at the end of the protector, and therefore, the wire harness, connected to the electric parts mounted within the door frame, can be positively received in the mounting member constituted by the grommet cover and the protector. Therefore, the mounting member is fitted in the recess in the door frame, and the wire harness can be easily installed to be connected to the electric parts within the door frame, and the efficiency of the assembling operation is enhanced, and the productivity is enhanced.

The retaining portion of the protector is engaged with the engagement portion of the inner member after the wire harness is received in the protector, and the winding portion, provided at the other end of the protector, and the winding member-winding portion, provided at the other end of the inner member, are tied together by the winding member wound on the winding portions.

Therefore, after the wire harness to be connected to the electric parts, mounted within the door frame, is received in the mounting member constituted by the grommet cover and the protector, the winding portions, provided respectively at the other ends of the protector and the inner member, are tied together at a time by the winding member wound on these winding portions. Therefore, the mounting member is fitted in the recess in the door frame, and the wire harness can be more easily installed to be connected to the electric parts within the door frame, and the efficiency of the assembling operation is further enhanced, and the productivity is further enhanced.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A wire harness-mounting construction comprising:

a generally L-shaped recess (2) continuously formed in a door side plate portion (A2) and a door inner plate portion (A1) of a door frame (A) which is openable from a vehicle body in a hinged manner, said L-shaped recess (2) includes a deep groove portion (3) and a shallow groove portion (5) which is formed shallow around said deep groove portion (3);

a mounting member (10) fittable in said L-shaped recess (2), said mounting member including a protector (30) received in said deep groove portion (3) and a grommet cover (11) coupled with said protector (30), in which said grommet cover (11) has an abutment surface (16) brought in surface-contact with said shallow groove portion (5) and a frame portion (12) formed on said abutment surface (16) for receiving said protector (30) therein, and a first projection (14) extending generally along a peripheral edge of said frame portion is formed on said abutment surface; and a wire harness (W) connectable to electric parts mounted within said door frame (A) at one end thereof, said wire harness (W) including a bundled end portion which is disposed at the other end thereof and outwardly projected from said doors frame (A) through a grommet (G) of said grommet cover (11), wherein when said grommet cover (11) is mounted in said L-shaped recess, said frame portion (12) contacts with said shallow groove portion and an inner seal portion for sealing said wire harness (W) is formed by bringing said first projection (14) in pressure contact with said shallow groove portion (5).

2. A wire harness-mounting construction according to claim 1, in which a slanting surface is formed at a peripheral portion of said shallow groove portion, and a second projection is formed integrally at a peripheral portion of said grommet cover which is abutted against said slanting surface, said second projection extending along the periphery of said grommet cover, and when said grommet cover is fitted in said recess, an outer seal portion for sealing said wire harness (W) is formed by bringing said second projection in pressure contact with said slanting surface.

3. A wire harness-mounting construction according to claim 2, in which said grommet cover is made of an elastic material, and an inner member made of a rigid material is integrally formed and embedded in said grommet cover.

4. A wire harness-mounting construction according to claim 2, in which a drain notch groove, communicating with the exterior, is formed at a lower portion in a vertical direction of one of the peripheral portion of said grommet cover and a peripheral portion of said recess.

5. A wire harness-mounting construction according to any one of claims 2 to 4, in which said second projection and said first projection are inclined downwardly toward an outer side of said door frame when said grommet cover is attached to said door frame.

6. A wire harness-mounting construction according to claim 5, in which said recess has a portion which is formed in said door side plate portion and is slanting downwardly toward the outer side of said door frame.

7. A wire harness-mounting construction according to claim 3, in which an engagement portion is formed on said inner member provided in said grommet cover, and a retaining portion for being retained by said engagement portion is formed at an end of said protector.

8. A wire harness-mounting construction according to claim 7, in which said retaining portion of said protector is engaged with said engagement portion of said inner member after said wire harness is received in said protector, and a winding portion, provided at the other end of said protector and a winding member-winding portion provided at the other end of said inner member, are tied together by a winding member wound on said winding portions.

9. A wire harness-mounting construction according to claim 7, wherein said first projection extends in a direction perpendicular to said abutment surface.

* * * * *